Aug. 21, 1951  G. W. WANNER  2,565,153
SPRING ACTUATED PIVOTED SNAP HOOK
Filed June 3, 1948
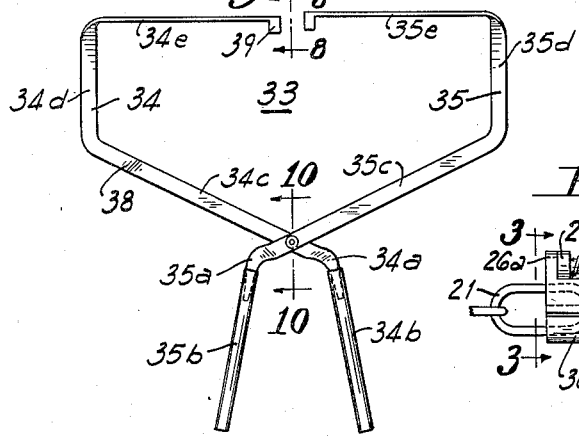
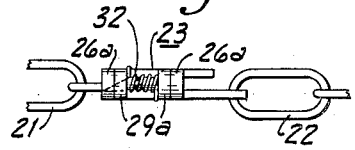
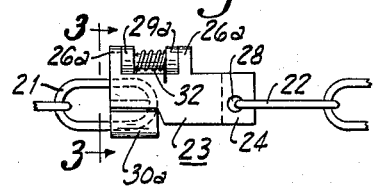
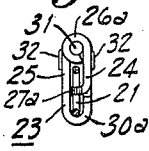
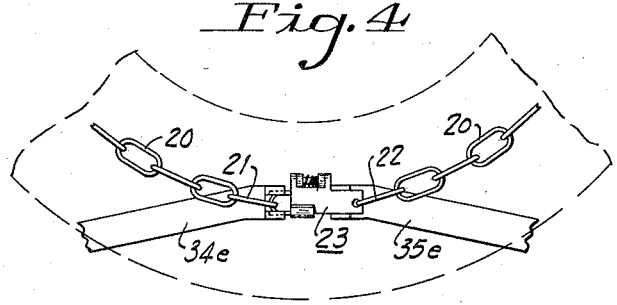
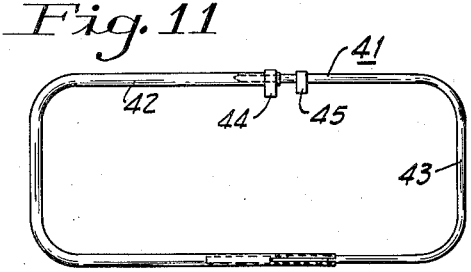
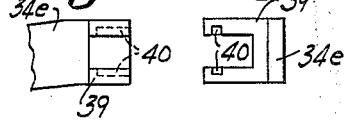
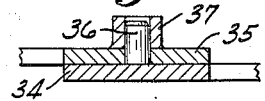
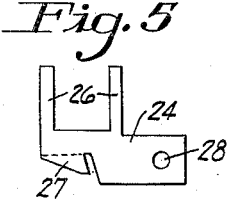
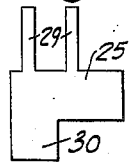
INVENTOR.
George W. Wanner
BY
Edward A. Laurence
His Attorney.

Patented Aug. 21, 1951

2,565,153

UNITED STATES PATENT OFFICE 2,565,153

SPRING ACTUATED PIVOTED SNAP HOOK

George W. Wanner, Aspinwall, Pa.

Application June 3, 1948, Serial No. 30,888

1 Claim. (Cl. 24—235)

The principal object which I have in view is the provision of means for quickly and conveniently applying antiskid chains to the wheels of motor vehicles without requiring the wheel to be jacked up from the ground or to stretch the antiskid chain out and run the wheel part way over it—the two usual methods of accomplishing the object in view.

In the practice of my present invention one of the ring chains is provided with a special clasp attached to one of its ends and into which clasp the link at the other end of the ring chain is inserted and gripped. The new form of clasp is attached to the inside ring chain while the outside ring chain may be provided at its ends with the conventional type of fastener element.

When the antiskid chain is to be applied to the wheel, the chain, with the ends of its ring chains disconnected, is draped over the wheel with the loose ends of the ring chains depending, the ring chain provided with my improved clasp being at the inside of the tire next the body of the vehicle.

The clasp at one end of the inside ring chain and the link at the other end of the latter are mounted in the two members of my improved partible tool, and by the assembly and relative approaching movement of the tool members the link is inserted in and engaged by the clasp. The ends of the outside chain are then connected together in the usual manner, thus completing the operation of applying the antiskid chain to the wheel.

A relative separating movement of said members disengages the members from the clasp and link, leaving the latter interlocked against accidental release.

When it is desired to remove the antiskid chain, the wheel is halted with the clasp at a convenient position, and by means of the fingers or a screw driver, the side plates of the clasp are separated and the link falls out of contact with the lug.

The clamp is formed of two plates springurged into substantially parallel spaced relation, one of the plates being provided with means, such as a hole in its end portion, for the permanent attachment of the clasp to one end of the ring chain, and one of the plates, preferably the same plate, is provided with a lug which extends toward the other plate and has an inclined surface facing the end of the clasp opposite to its end where the end of the ring chain is permanently attached. When the link at the other end of the chain is forcibly inserted, as by means of the above-mentioned tool, the front end of the link rides up the inclined surface of the lug, spreading the hinged plates apart so that the link drops down over the lug and is engaged thereby; the plates then returning to their closed or parallel position.

Means are provided to prevent the link sagging or becoming misaligned as it is being inserted into the clasp.

Other novel features of construction and arrangement of parts will appear from the following description.

In the accompanying drawings, which are intended to illustrate practical embodiments of the principles of the invention, Fig. 1 is an elevation showing my improved clasp employed to connect the ends of a ring chain;

Fig. 2 is a side view of the same;

Fig. 3 is an end view of the same looking from the left of the line 3—3 in Fig. 2;

Fig. 4 is a view illustrating the method of engaging the ends of the inside ring chain to lock the antiskid chain assembly on a tire, the tire in front of the clasp being indicated by dotted lines;

Fig. 5 is a view showing the blank from which the main plate of the clasp is bent up to form;

Fig. 6 is a like view showing the guard plate blank;

Fig. 7 is a plan view showing the preferred form of tool for connecting the ends of the ring chain after the antiskid chain has been dropped over the tire;

Fig. 8 is an enlarged detail view looking from the right of the line 8—8 in Fig. 7;

Fig. 9 is a side elevation looking from the left in Fig. 8.

Fig. 10 is an enlarged sectional view taken on the line 10—10 in Fig. 7 and showing the partible pivotal connection of the tong member, and Fig. 11 is a plan view showing a modified form of the tool.

Referring to the drawings, 20 indicates a length of chain, the ends of which are to be securely but detachably connected, as for instance a ring chain of an automobile antiskid device. The terminal links at the opposite ends of the chain are indicated at 21 and 22.

23 indicates my improved clasp for connecting the ends of the chain 20 together. This clasp comprises a pair of side plates, the main plate 24 and the keeper plate 25 hinged together along one of their longitudinal edges and spring-urged towards each other. The plates 24 and 25 may be conveniently cut from a plate of steel, preferably of high carbon content to resist wear, and bent to shape.

Thus the cut blank for the main plate 24 before bending to final shape is illustrated in Fig. 5, the same being provided adjacent its one end with a pair of spaced apart integral tongues 26 extending from its longitudinal edge, which tongues 26 are bent arcuately downwardly and inwardly against the inner face of the plate to form pintle-sleeves 26a, as shown in Figs. 1, 2 and 3.

The opposite longitudinal edge of the plate 24 is inclined upwardly at its end adjacent the tongues to form an inclined surface and at the inner end of such inclined portion the plate is cut upwardly and preferably on a slant toward the adjacent end edge of the plate, thus outlining a stud portion 27 which is bent inwardly at right angles to the body of the plate along the dotted line in Fig. 5, to provide a lug 27a, shown in Fig. 3. At the opposite end of the plate a hole 28 is punched through the plate to which the terminal link 22 is permanently connected.

The keeper plate 25 is formed by bending up the blank shown in Fig. 6 which has two spaced apart tongues 29 extending outwardly from one of the longitudinal edges and adjacent one end of the plate, a rectangular projection 30 extending from its other longitudinal edge adjacent the opposite end. The tongues 29 are bent down arcuately and inwardly to form the pintle-sleeves 29a, shown in Figs. 1, 2 and 4, and the projection 30 is bent inwardly and upwardly to form the trough flange 30a which closes the longitudinal edge of the clasp.

The sleeves 26a of the main plate 24 and the sleeves 29a of the keeper plate 25 are so positioned that they are aligned when the plates 24 and 25 are assembled together, preventing relative longitudinal movement of the plates, and a pintle 31 extends through the registered sleeves and is held against displacement as by riveting its end.

32 indicates a strong helical spring wound about the intermediate portion of the pintle 31, between the sleeves 29a, and having its ends extending tangentially and bearing against the outer surfaces of the plates 24 and 25, thus spring-urging said plates toward each other. When the plates are assembled the stud 27a extends toward the keeper plate 25 and presents its inclined surface toward the adjacent end of the clasp, so that when the front end of the link 21 is forcibly inserted into the adjacent end of the clasp, it will ride up along the inclined surface of the lug, spreading the plates apart as it wedges its way in until the advancing link drops down over the stud 27a and is engaged therewith against accidental escape.

The trough flange 30a, when the plates are assembled, bridges the space between the plates and with its free edge extending upwardly toward the adjacent edge of the plate 24, thus preventing misalignment of the link 21 as it enters the clasp. Thus the path of travel of the entering link is defined at its one edge of the clasp by the trough 30a and at the opposite edge by the pintle-sleeves.

In mounting the antiskid chain assembly on a wheel the assembly is first draped down over the wheel with the disconnected ends of the two ring chains depending at the front and rear of the wheel, the ring chain which is provided with my improved clasp being at the inside of the wheel— that is, next to the vehicle body, with the free end of the ring chain at which the clasp is permanently attached to the right of a person facing the wheel.

The person first, by the use of my improved tool, which is hereinafter described, seizes the clasp and the terminal link at the other end of the ring chain and forces the link into the interior of the clasp and into locking engagement with the lug. The ends of the outside chain are then connected in the usual manner.

In Figs. 4, 7, 8 and 9 the preferred form of this tool is illustrated. This embodiment of the tool is in the form of a partible tongs 33, composed of arms 34 and 35, and provided with means to connect the arms pivotally at a point intermediate of their ends.

The pivotal connection between the arms 34 and 35 is such that the arms may be quickly pivotally connected and disconnected without the use of tools.

Thus I have shown the arm 34 provided with an upwardly extending cylindrical pivot stud 36 which may be welded or otherwise permanently fixed to the leg, while the arm 35 is provided with a hole and registering with the hole a tubular sleeve 37 welded or otherwise rigidly secured to the arm 35. The interior diameter of the hole and of the sleeve 37 is such that the legs may be quickly assembled to complete the tongs, and may as quickly be disassembled for storage in the automobile.

The arms preferably are made of flat bar stock, the short ends 34a and 35a thereof being turned up into substantially cylindrical form so that tubular extension handles 34b and 35b may be slipped thereon to provide better leverage when the tongs are to be used, such extensions being removed when the tool is to be stored.

The longer end portions of the arms 34 and 35 diverge outwardly from their pivot points, as illustrated at 34c, 35c, to provide clearance for the tire of the wheel, and then are provided with straight portions 34d, 35d which, when the tool is to be used, may extend at the front and rear of the wheel and towards the automobile body, and have converging terminal portions 34e, 35e which are arranged to move toward each other as the tongs are closed in to bring the clasp and the terminal link into locking engagement. At the angles between the portions 34d and 34c and 35d and 35c the flat metal of the legs 34 and 35 is twisted ninety degrees so that the width of the flat metal is disposed vertically. Also the under leg 34 is bent at 38 to elevate its portions 34d and 34e to the same plane as that of the corresponding portions 35d and 35e of the arm 35 and the free ends of the portions 34e and 35e will be disposed and move in the same plane when the tong arms are assembled in pivotal relation.

The free ends of the portions 34e and 35e are provided with the three-sided sockets 39 which may be welded to the free ends of the portions 34e and 35e. The upper and lower walls of the sockets are provided interiorly with the slots 40 which are open to the ends of the tong arms but do not extend to the rear of the socket. The socket 39 of the tong arm 34 is designed to receive the terminal link 22 of one end of the ring chain, while the socket 39 of the other arm 35 is designed to receive the clasp 23, as illustrated in Fig. 4, the grooves in the first instance receiving the longitudinal sides of the link and in the other instance the top and bottom edges of the main plate 24 of the clasp, the closed inner ends of the slots limiting the degree of insertion of the link and of the clasp into the boxes.

In applying the tongs to the disconnected ends of the ring chain, which depend, as above described, at the inside and at the front and rear of the wheel, the tong arms are disconnected and are separately introduced towards the body of the automobile at the front and rear of the wheel with their sockets 39 adjacent to the loose ends of the ring chain. Then the end link 22 of the chain is inserted in place in the socket 39 of the tong arm 34, and the clasp 23 attached to the other end of the ring chain is similarly mounted in the socket 39 of the tong arm 35. The tong arms are then pivotally connected as above described and the handles 34a and 35a are pushed toward each other, forcibly advancing the end link 22 and the clasp 23 in opposite directions until the link is telescoped in the clasp and becomes engaged over the stud 27a. The tong arms are then released from the link and the clasp by a parting movement of the arms. The arms may then be disassembled and stored.

The engagement of the clasp 23 and the link 22 may be quickly released by swinging the guard plate away from the main plate with the fingers or a screw driver, thus releasing the link from the stud.

In Fig. 11 I show at 41 a modified form of tool comprising the two U-shape members 42 and 43 having arcuate central portions and parallel legs. The member 42 is tubular and of such internal diameter to permit the legs of the members 43 to be telescoped therein and slide relative thereto. One leg of the member 42 is provided adjacent one end with a socket 44, similar to socket 39 of the tool 33, and the corresponding leg of the member 43 is similarly provided with a like socket 45 secured some distance from the end of the leg.

In the use of the tool 41, the legs 42 and 43 are separated and one leg placed at the front and the other leg at the rear of the tool with the legs of the two members disposed toward each other and straddling the wheel. The members 42 and 43 are then slid toward each other, the legs of the member 43 telescoping in the legs of the member 42, and the link 22 and the clasp 23 are mounted in the opposed sockets 44 and 45. Then the members are pushed toward each other in telescopic manner until the link engages and becomes locked in the clasp, whereupon the members 42 and 43 are separated and the tool removed.

It is obvious that my invention affords means for conveniently and quickly mounting antiskid chains on automobile wheels without jacking up the wheel or stretching the chain on the ground and running the wheel thereon.

I claim:

A clasp to connect the adjacent ends of a chain, comprising a plate having an upwardly extending pintle on one side to form a hinge part, a second plate having a downwardly extending pintle to cooperate with the pintle of the first plate, a pin in said cooperating pintles to maintain said plates in hinged relation, spring means urging said plates together, means to secure one chain end to one end of said second plate, the marginal side edge opposite the hinge of said second plate being bent downwardly to form a lug that extends closely adjacent the first plate and in line with the means securing said chain end, both end edges of said lug sloping toward said chain end, and the marginal side edge opposite the hinge of said first plate having an upwardly and inwardly projecting flange mating with the marginal edge of said second plate and coextensive with said lug to close the gap formed by the latter, said flange acting with said hinge as a guide for the free link of the other chain and as it is inserted into the clasp, spreading said plates when sliding over said lug, and then becoming locked on the inner end edge of said lug in line with said secured chain end.

GEORGE W. WANNER.

REFERENCES CITED

The following references are of record in the file of this patent:

UNITED STATES PATENTS

| Number | Name | Date |
|---|---|---|
| 248,936 | Lindsay | Nov. 1, 1881 |
| 454,104 | Wyatt | June 16, 1891 |
| 1,199,690 | Gillam | Sept. 26, 1916 |
| 1,275,034 | Huxley | Aug. 6, 1918 |
| 1,357,151 | Dalhaus | Oct. 26, 1920 |
| 1,397,382 | Levine | Nov. 15, 1921 |
| 1,471,675 | Wilson | Oct. 23, 1923 |
| 1,677,109 | Korper | July 10, 1928 |
| 1,745,965 | White | Feb. 4, 1930 |
| 1,959,318 | Sunback | May 15, 1934 |
| 2,068,887 | Meyers | Jan. 26, 1937 |
| 2,333,877 | Murphy | Nov. 9, 1943 |
| 2,526,705 | Smith | Oct. 24, 1950 |

Certificate of Correction

Patent No. 2,565,153                                                August 21, 1951

GEORGE W. WANNER

It is hereby certified that error appears in the printed specification of the above numbered patent requiring correction as follows:

Column 6, line 25, for "chain and" read *chain end*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*